US011211789B2

(12) United States Patent
Despesse

(10) Patent No.: US 11,211,789 B2
(45) Date of Patent: Dec. 28, 2021

(54) CAPACITIVE POWER SUPPLY CIRCUIT

(71) Applicant: Commissariat à l'Énergie Atomique et aux Énergies Alternatives, Paris (FR)

(72) Inventor: Ghislain Despesse, Voreppe (FR)

(73) Assignee: Commissariat à l'Énergie Atomique et aux Énergies Alternatives, Paris (FR)

(*) Notice: Subject to any disclaimer, the term of this patent is extended or adjusted under 35 U.S.C. 154(b) by 0 days.

(21) Appl. No.: 16/869,353

(22) Filed: May 7, 2020

(65) Prior Publication Data
US 2020/0358284 A1 Nov. 12, 2020

(30) Foreign Application Priority Data

May 10, 2019 (FR) ...................................... 1904879

(51) Int. Cl.
*H02H 9/00* (2006.01)
*H01G 2/10* (2006.01)
*H02M 7/06* (2006.01)

(52) U.S. Cl.
CPC ................ *H02H 9/00* (2013.01); *H01G 2/10* (2013.01); *H02M 7/06* (2013.01)

(58) Field of Classification Search
CPC .............. H02H 9/00; H01G 2/10; H02M 7/06
See application file for complete search history.

(56) References Cited

U.S. PATENT DOCUMENTS

| 4,408,269 | | 10/1983 | Nowaczyk | |
|---|---|---|---|---|
| 4,546,305 | * | 10/1985 | Goddijn | H02H 11/007 323/299 |
| 5,063,340 | * | 11/1991 | Kalenowsky | H02J 7/0016 320/166 |
| 5,721,675 | * | 2/1998 | Lee | H02H 9/005 363/44 |
| 5,953,221 | * | 9/1999 | Kuhn | H02M 1/10 363/53 |
| 8,730,689 | * | 5/2014 | De Haan | H02M 7/062 363/52 |
| 2009/0290396 | * | 11/2009 | Carcouet | H02M 7/06 363/126 |
| 2012/0155138 | * | 6/2012 | Gonthier | H02M 7/062 363/126 |

FOREIGN PATENT DOCUMENTS

EP 2 124 310 A1 11/2009

OTHER PUBLICATIONS

FR1904879, Feb. 28, 2020, Preliminary Search Report.
Preliminary Search Report for French Application No. 1904879, dated Feb. 28, 2020.

* cited by examiner

*Primary Examiner* — Scott Bauer
(74) *Attorney, Agent, or Firm* — Wolf, Greenfield & Sacks, P.C.

(57) ABSTRACT

A capacitive power supply circuit including, between first and second terminals of application of an AC input voltage, a distributed capacitive structure including a plurality of elementary capacitive units, each including a current limiter series-connected with a capacitor between first and second terminals of the unit and a voltage limiter connected in parallel with the capacitor, the elementary capacitive units being series-coupled by their first and second terminals.

18 Claims, 5 Drawing Sheets

CAPACITIVE POWER SUPPLY CIRCUIT

The present patent application claims the priority benefit of French patent application FR19/04879, which is herein incorporated by reference.

TECHNICAL BACKGROUND

The present disclosure generally relates to electronic circuits and, more particularly, to circuits for generating a DC voltage from an AC voltage. The present invention more particularly applies to capacitive power supply circuits.

PRIOR ART

Capacitive power supply circuits are also used in electronics and are used to generate a DC power supply voltage from an AC voltage. Such power supply circuits conventionally comprise a capacitor in series with an output conversion unit between terminals of application of the AC input voltage.

It would be desirable to at least partly improve certain aspects of known capacitive power supply circuits.

SUMMARY

For this purpose, an embodiment provides a capacitive power supply circuit comprising, between first and second terminals of application of an AC input voltage, a distributed capacitive structure comprising a plurality of elementary capacitive units, each comprising a current limiter series-connected with a capacitor between first and second terminals of the unit and a voltage limiter connected in parallel with the capacitor, the elementary capacitive units being series-coupled by their first and second terminals.

According to an embodiment, the capacitive power supply circuit further comprises an output conversion unit in series with a distributed capacitive structure between the first and second terminals of application of the AC input voltage.

According to an embodiment, the distance between the capacitors of neighboring elementary capacitive units is greater than or equal to 1 cm, the distance between the current limiters of neighboring elementary capacitive units is greater than or equal to 1 cm, and the distance between the voltage limiters of neighboring elementary capacitive units is greater than or equal to 1 cm.

According to an embodiment, in each elementary capacitive unit, the voltage limiter has a turn-on threshold in the range from 10 to 40% of the nominal amplitude of the AC input voltage.

According to an embodiment, in each elementary capacitive unit, the current limiter triggers when the current that it conducts exceeds a predetermined threshold.

According to an embodiment, in each elementary capacitive unit, the current limiter is triggered via a control signal generated by the voltage limiter.

According to an embodiment, in each elementary capacitive unit, the current limiter is bidirectional for current and the voltage limiter is bidirectional for voltage.

According to an embodiment, in each elementary capacitive unit, the voltage limiter comprises:
 a varistor, for example, a metal-oxide varistor, for example, a zinc-oxide varistor; or
 a series association of two Zener diodes head-to-tail; or
 a transistor assembly; or
 a spark gap.

According to an embodiment, in each elementary capacitive unit, the voltage limiter comprises:
 a thermo-resistor or a thermistor,
 a resettable fuse; or
 a transistor assembly.

According to an embodiment, in each elementary capacitive unit, the current limiter comprises a first branch comprising a first bipolar transistor and a first resistor in series between first and second conduction terminals of the current limiter and, in parallel with the first branch, a second branch comprising a second resistor and a second bipolar transistor in series between the first and second conduction terminals of the current limiter, the first and second bipolar transistors being of the same conductivity type, the first transistor having a control node coupled to the junction point of the second resistor and of the second transistor, and the second transistor having a control node coupled to the junction point of the first transistor and of the first resistor.

According to an embodiment, in each elementary capacitive unit, the current limiter comprises first and second bipolar transistors having opposite conductivity types series-connected between first and second conduction terminals of the current limiter, the first transistor having a control terminal connected to a control terminal of the second transistor, the control terminals of the first and second transistors being coupled on the one hand to a control terminal of the current limiter via a first resistor and on the other hand to the first conduction terminal of the current limiter via a second resistor.

According to an embodiment, in each elementary capacitive unit, the voltage limiter comprises first and second varistors in series between first and second electrodes of the capacitor, the junction point between the first and second varistors being connected to the control terminal of the current limiter.

According to an embodiment, each elementary capacitive unit is formed of three discrete components respectively corresponding to the capacitor, to the current limiter, and to the voltage limiter, the elementary capacitive units being arranged linearly so that the capacitors of any two neighboring elementary capacitive units are separated by the current limiter of one of the two units, and so that the voltage limiters of any two neighboring elementary capacitive units are separated by the current limiter of one of the two units.

According to an embodiment, the elementary capacitive units are arranged in a same insulating protection sheath.

According to an embodiment, the distributed capacitive structure comprises a plurality of insulators, each comprising a plate made of an insulating material, a first metallic bonding part fastened to a first surface of the plate, and a second metallic bonding part fastened to a second surface of the plate, the insulators being series-coupled by their first and second metallic bonding parts, and each elementary capacitive unit being arranged in a cavity formed in the plate of one of the insulators and having its first and second terminals in contact respectively with the first and second metallic bonding parts of the insulator.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, what use is made of the DC voltage generated by the capacitive power supply circuit has not been detailed, the described embodiments being compatible with usual applications of capacitive power supply circuits.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front". "back". "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
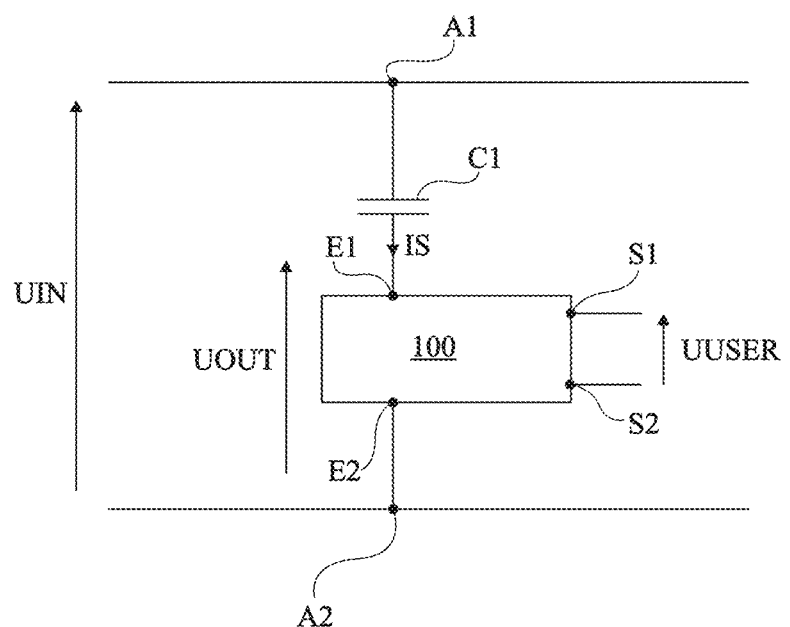
FIG. 1 is a simplified electric diagram of an example of a capacitive power supply circuit.

FIG. 1 is a simplified electric diagram of an example of a capacitive power supply circuit.

The circuit of FIG. 1 comprises a capacitor C1 in series with an output conversion unit 100 between terminals or rails A1 and A2 of application of an AC input voltage UIN. In the example of FIG. 1, capacitor C1 has a first electrode coupled, for example, connected, to terminal A1, and a second electrode coupled, for example, connected, to a first input terminal E1 of output conversion unit 100. Output conversion unit 100 further comprises a second input terminal E2 coupled, for example, connected, to terminal A2.

The function of capacitor C1 is to limit the current IS supplied to output conversion unit 100. Output conversion unit 100 sees between its input terminals E1 and E2 a voltage UOUT which corresponds to the difference between input voltage UIN and the voltage across capacitor CL. In operation, unit 100 delivers, between first and second output terminals S1 and S2, a DC output voltage UUSER intended to power a load, not shown.

The electric diagram of output conversion unit 100 has not been detailed, the described embodiments being compatible with all or most output conversion units of known capacitive power supply circuits. As an example, unit 100 may comprise a buck transformer comprising a primary winding connected between terminals E1 and E2 and a secondary winding coupled by electromagnetic coupling to the secondary winding, and a rectifying and filtering circuit having input terminals respectively connected to the terminals of the secondary winding of the transformer and output terminals respectively connected to terminals S1 and S2. As a variant, unit 100 comprises a switched-mode power supply circuit comprising input terminals respectively connected to terminal E1 and E2 and output terminals respectively connected to terminals S1 and S2. In another variant, unit 100 comprises a rectifying and filtering circuit having input terminals respectively directly connected to terminals E1 and E2 and output terminals respectively connected to terminals S1 and S2.

A difficulty which arises in the capacitive power supply circuit of FIG. 1 is that capacitor C1 should be able to withstand high voltages with not degradation. Indeed, the voltage UOUT across output conversion unit 100 may be low as compared with input voltage UIN, for example, smaller than one fifth of the nominal amplitude UIN_NOM of voltage UIN, whereby capacitor C1 sees between its terminals a voltage in the order of voltage UIN. Further, voltage UIN may be subject to parasitic overvoltage peaks, for example capable of reaching more than twice the nominal amplitude UIN_NOM of voltage UIN. Capacitor C1 should be capable of withstanding the overvoltage peaks with no degradation.

The cost and the bulk of capacitor C1 may thus be significant, particularly in applications where loads are desired to be powered with relatively low voltages, for example, smaller than 50 volts, directly from high-voltage lines, for example, from a voltage UIN of nominal amplitude UIN-NOM greater than 10,000 volts, for example, in the order of 100.000 volts.

It should in particular be noted that increasing the breakdown voltage of capacitor C1 by a factor n substantially amounts to multiplying by n the dielectric thickness of the capacitor, and thus to multiplying by n the surface area of the capacitor to maintain its capacitance unchanged. In other words, increasing the breakdown voltage of capacitor C1 by a factor n amounts to increasing its volume by a factor $n^2$. Sizing capacitor C1 to withstand the overvoltage peaks of input voltage UIN thus generates a particularly high excess cost and an excess bulk. For example, sizing capacitor C1 to withstand overvoltage peaks capable of reaching up to ten times the nominal amplitude UIN-NOM of voltage UIN amounts to oversizing the capacitor bulk by a factor 100 with respect to the need in normal operation, that is, when voltage UIN does not exceed its nominal value UIN-NOM.

Figure 2:
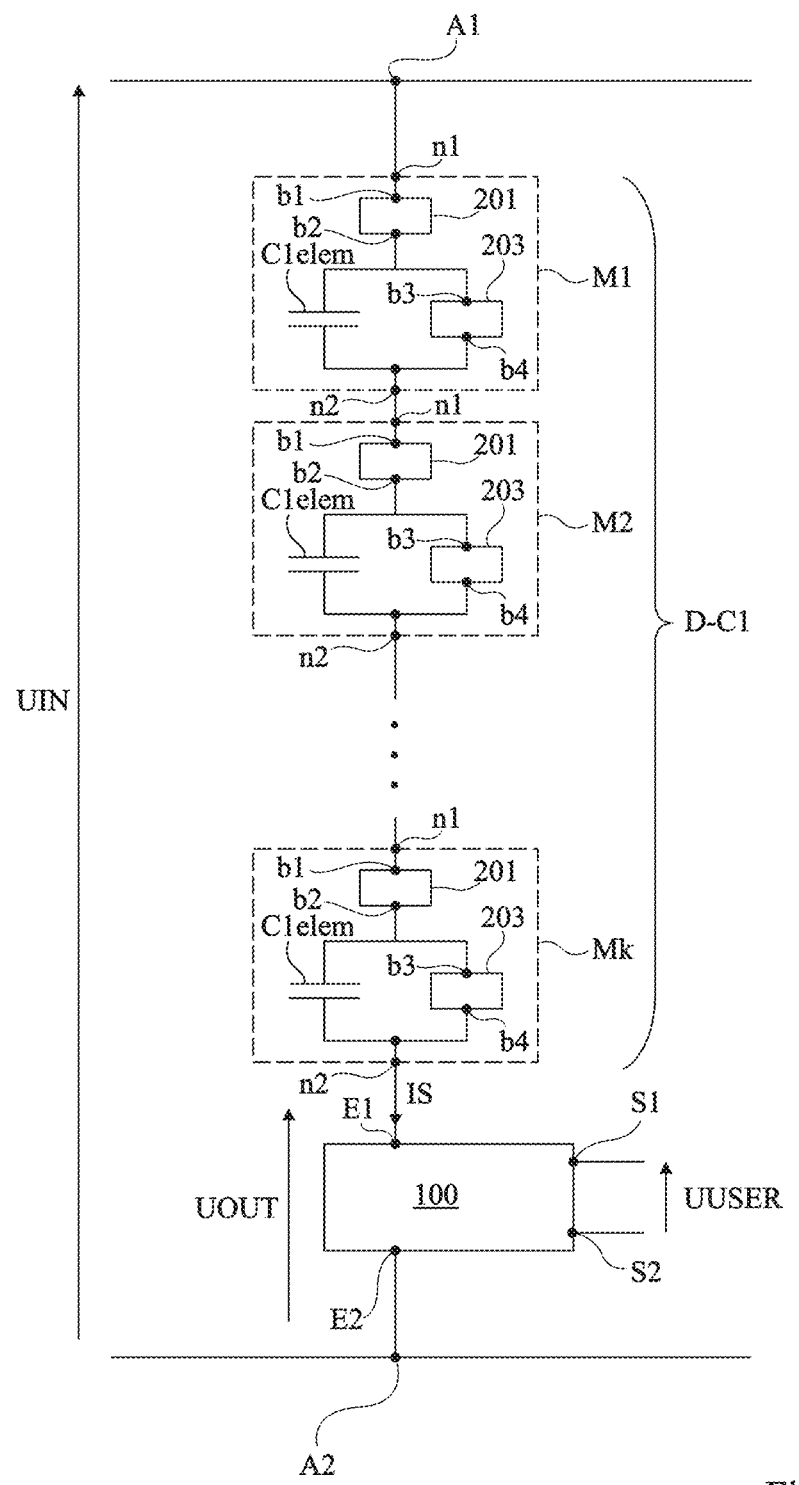
FIG. 2 is a simplified electric diagram of an example of a capacitive power supply circuit according to an embodiment.

FIG. 2 is a simplified electric diagram of an example of a capacitive power supply circuit according to an embodiment.

The circuit of FIG. 2 differs from the circuit of FIG. 1 mainly in that, in the circuit of FIG. 2, the capacitor C1 of FIG. 1 has been replaced with a distributed capacitive structure D-C1.

Distributed capacitive structure D-C1 comprises K elementary capacitive units M1, . . . MK, where K is an integer greater than or equal to 2. Units M1, . . . MK are for example identical, to within manufacturing dispersions.

Each unit Mi, i being an integer in the range from 1 to K, comprises an elementary capacitor C1elem, a current limiter 201, and a voltage limiter 203. Capacitor C1elem and current limiter 201 are series-connected between a terminal n1 and a terminal n2 of the unit, and voltage limiter 203 is connected in parallel to capacitor C1elem. More particularly, current limiter 201 has a first conduction terminal b1 coupled, for example, connected, to the terminal n1 of the unit and a second conduction terminal b2 coupled, for example, connected, to a first electrode of capacitor C1elem, a second electrode of capacitor C1elem being coupled, for example, connected, to terminal n2 of the unit. Voltage limiter 203 has a first conduction terminal b3 coupled, for example, connected, to the first electrode of capacitor C1elem and a second conduction terminal b4 coupled, for example, connected, to the second electrode of capacitor C1elem.

Units M1, . . . MK are series-coupled, by their terminals n1 and n2, between terminal A1 of application of AC input voltage UIN and terminal E1 of output conversion unit 100. More particularly, in the shown example, each unit Mi except for unit M1 has its terminal n1 coupled, for example, connected, to the terminal n2 of unit Mi−1, terminal n1 of unit M1 being coupled, for example, connected, to terminal A1 and terminal n2 of unit MK being coupled, for example, to terminal E1.

Voltage UIN is thus distributed over the K elementary units, which limits the voltage seen by each unit and enables to spatially distribute the electric field. This enables to use, within each unit, relatively low-voltage electronic components, which accordingly have a relatively low cost and bulk.

In each unit $M_i$, as long as input voltage UIN does not exceed nominal amplitude UIN-NOM, current limiter 201 substantially behaves as a closed circuit, and current limiter 203 substantially behaves as an open circuit. The unit then substantially behaves as a capacitance having a value equal to the capacitance of capacitor C1elem. The assembly of the units placed in series thus forms a distributed capacitive structure having an equivalent capacitance substantially equal to C1elem/K. This capacitance is sized to supply the desired current IS to output conversion unit 100, when voltage UIN is at its nominal value.

When input voltage UIN exceeds a predetermined threshold TH1 greater than its nominal amplitude UIN-NOM, for example, in the range from 10% to 40% of its nominal amplitude UIN-NOM, the voltage limiter 203 of each unit Mi triggers and draws current to limit the voltage increase across capacitor C1elem. Further, current limiter 201 limits the current entering into the unit, to limit the current flowing through voltage limiter 203. Thus, current limiter 201 absorbs the most part of the energy/power excess due to the overvoltage, which allows an equivalent decrease of the maximum breakdown voltage value of capacitor C1elem, and thus of its cost and bulk. Further, current limiter 201 contributes to limiting the current peak on current IS in case of an overvoltage and/or of a strong variation (dV/dt) of voltage UIN, for example due to a parasitic disturbance (lightning, electric arc, short-circuit, opening of a circuit breaker, etc.). Current limiter 201 may operate autonomously to decrease current IS or even temporarily interrupt current IS when the latter exceeds a predetermined turn-on threshold. As a variant, current limiter 201 may be controlled by voltage limiter 203 (via a control link, not detailed in FIG. 1) to decrease current IS or even interrupt current IS when voltage limiter 203 triggers.

During the presence of the overvoltage, current limiter 201 and voltage limiter 203 dissipate energy in the form of heat. The provision of a distributed structure of the type described in relation with FIG. 2 advantageously enables to distribute the heat dissipation in space, and thus to ease its discharge.

Preferably, the distance between capacitors C1elem of neighboring units is greater than or equal to 1 cm, the distance between current limiters 201 of neighboring units is greater than or equal to 1 cm, and the distance between voltage limiters 203 of neighboring units is greater than or equal to 1 cm. Preferably, the spatial distance between two units Mi is all the higher as the units are electrically distant from each other, that is, their respective ranks i in the series association are distant. Indeed, the potential difference between two units Mi is all the higher as the units are electrically distant in the series association of units.

In nominal state, that is, in the absence of an overvoltage, current and voltage limiters 201 and 203 are not active, so that the efficiency of the power transfer between high-voltage terminals A1 and A2 and output conversion unit 100 is relatively high, for example, greater than 70%.

In each unit $M_i$, voltage limiter 203 is bidirectional for voltage, to be able to limit the voltage across capacitor C1elem in the two biasings. Voltage limiter 203 for example comprises a varistor, for example, of MOV (Metal Oxide Varistor) type, having a first end coupled, for example, connected, to its terminal b3 and a second end coupled, for example, connected, to its terminal b4. As an example, the varistor may be a ZNR-type varistor, that is, a zinc-oxide varistor. As a variant, voltage limiter 203 may comprise two Zener diodes in series, head-to-tail, between its terminal b3 and its terminal b4. In another variant, voltage limiter 203 may comprise a spark gap (device used to limit overvoltages and form fast short-circuits by means of an electric arc caused by ionization of a gas) having a first electrode coupled, for example, connected, to its terminal b3 and a second electrode coupled, for example, connected, to its terminal b4.

Current limiter 201 is bidirectional for current, to be able to limit current IS in the two biasings. As an example, current limiter 201 comprises a resistor, a thermo-resistor, or a thermistor, having a first end coupled, for example, connected, to its terminal b1 and a second end coupled, for example, connected, to its terminal b2. As a variant, current limiter 201 may comprise a resettable fuse having a first terminal coupled, for example, connected, to its terminal b1 and a second terminal coupled, for example, connected, to its terminal b2. In another variant, current limiter 201 may comprise a transistor assembly.

The capacitive power supply circuit of FIG. 2 is particularly advantageous for applications requiring supplying a relatively low-power load directly from a high-voltage electric network, for example, a single-phase or three-phase network conducting an AC voltage having a nominal amplitude greater than 10.000 volts, for example, in the order of 100.000 volts. Such a circuit may for example be used to power electric equipment on a tower or an electric line (sensors, telecommunications relays, calculators, drone, low-consumption equipment, for example, having a power lower than 1 kW, etc.).

As a variant, the capacitive power supply circuit of FIG. 2 may be used under an input power supply voltage UIN of smaller amplitude, for example, having a nominal amplitude smaller than 10,000 volts, for example, the mains voltage (having a nominal amplitude in the order of 230 volts).

In a non-limiting embodiment, electrodes (not shown) of connection to an external device may be spatially distributed along the entire length of the distributed capacitive structure, respectively connected to the common terminals between the consecutive units Mi of the series association of units Mi. Thus provides a capacitive structure adapted to different ranges of input voltage UIN, and thus to different uses. According to the considered input power supply voltage UIN, it may then be provided to connect terminal A1:

either to terminal n1 of the first unit M1 of the structure, in which case all the units Mi in the structure will be used, which is particularly adapted for input voltages UIN of relatively high amplitude;

or to an intermediate electrode between two consecutive units Mi of the structure, in which case only the units Mi located between the intermediate electrode and the terminal n2 of unit Mk will be used, which may be adapted for input voltages UIN of smaller amplitude.

The provision of such intermediate electrodes is particularly adapted when it is desired to power a load, for example, a drone to be charged, directly from cables of a high-voltage line. Indeed, the spacing between two conductors of an electric line is generally all the larger as the voltage between the two conductors is high. Thus, in the case where units Mi are arranged in a linear arrangement, a same distributed capacitive structure may be used on different types of high-voltage lines having different voltage levels and thus different spacings. For the highest voltages, the spacing between conductors being larger, the number of capacitive units Mi used will be larger. Conversely, for lower voltages, the spacing between conductors being decreased, the number of capacitive units Mi used will be smaller.

As a variant, it may be provided to manufacture the distributed capacitive structure in the form of a strip which is then cut into pieces having lengths selected according to the considered applications and in particular to the envisaged input power supply voltages UIN.

Figure 3:
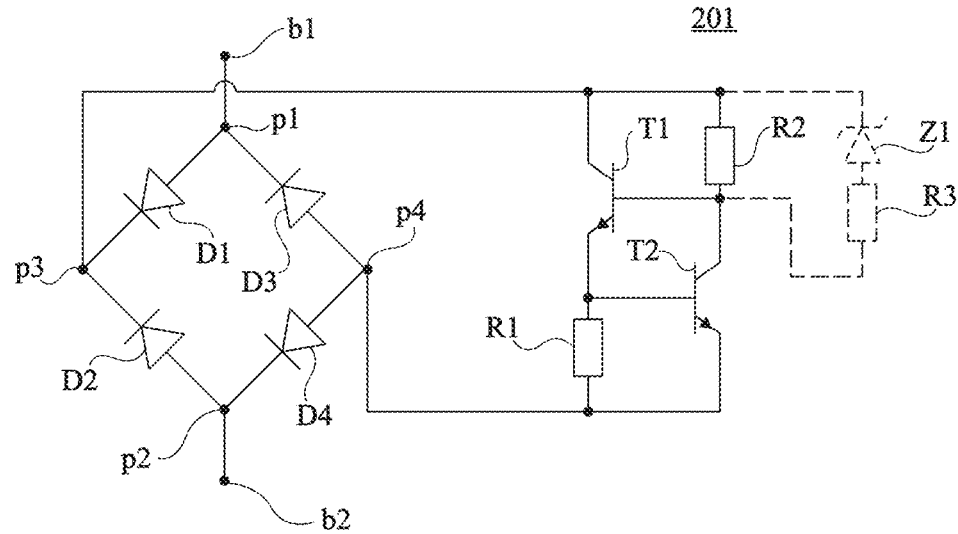
FIG. 3 is an electric diagram of an embodiment of a current limiter of the capacitive power supply circuit of FIG. 2.

FIG. 3 is an electric diagram of an embodiment of the current limiter 201 of the units Mi of the circuit of FIG. 2.

It should be noted that although, in the example of FIG. 2, output conversion unit 100 is connected to an end of the series association of units Mi, the described embodiments are not limited to this specific case. As a variant, output conversion unit 100 may be interposed between any two neighboring units Mi of distributed capacitive structure D-C1.

The current limiter 201 of FIG. 3 comprises a rectifying diode bridge, comprising two input nodes p1 and p2 coupled, for example, connected, respectively to terminals b and b2 of the current limiter, and two output nodes p3 and p4. More particularly, in this example, the rectifying bridge comprises four diodes D1, D2, D3, and D4. Diode D1 has its anode coupled, for example, connected, to node p1 and its cathode coupled, for example, connected, to node p3, diode D2 has its anode coupled, for example, connected, to node p2 and its cathode coupled, for example, connected, to node p3, diode D3 has its anode coupled, for example, connected, to node p4 and its cathode coupled, for example, connected, to node p1, and diode D4 has its anode coupled, for example, connected, to node p4 and its cathode coupled, for example, connected, to node p2.

The current limiter 201 of FIG. 3 further comprises, between nodes p3 and p4, a first branch comprising a transistor T1 in series with a resistor R1 and, in parallel with the first branch, a second branch comprising a resistor R2 in series with a transistor T2. Transistor T1 has a first conduction node coupled, for example, connected, to node p3 and a second conduction node coupled, for example, connected, to a first end of resistor R1, the second end of resistor R1 being coupled, for example connected, to node p4. Transistor T2 has a first conduction node coupled, for example connected, to node p4 and a second conduction node coupled, for example, connected, to a first end of resistor R2, the second end of resistor R2 being coupled, for example, connected, to node p3. Transistor T1 has a control node coupled, for example, connected, to the junction point of resistor R2 and of transistor T2, and transistor T2 has a control node coupled, for example, connected, to the junction point of transistor T1 and of resistor R1. Transistors T1 and T2 are for example bipolar NPN-type transistors, transistor T1 having its collector on the side of node p3 and its emitter on the side of resistor R1, and transistor T2 having its collector on the side of resistor R2 and its emitter on the side of node p4.

Resistor R2 is for example much greater than resistor R1, for example, at least ten times greater than resistor R1.

The assembly of FIG. 3 regulates the voltage across resistor R1 to a value substantially equal to the threshold voltage of transistors T1 and T2, for example, in the order of 0.6 volt, so that the current between terminals b1 and b2 of current limiter 201 remains substantially constant.

It should be noted that, in the distributed capacitive structure D-C1 of FIG. 2, if the capacitances of capacitors C1elem and/or the responses of the voltage limiters 203 of the different units are not strictly identical (for example, due to manufacturing dispersions), current limiters 201 may not all exactly act at the same time. If the dispersion is light, the current conducted by the current limiter of the first unit Mi to be turned on enables the other units Mi to carry on their voltage rise and to rapidly reach their respective turn-on thresholds. This enables to avoid for a single current limiter 201 to have to withstand the entire input overvoltage. This process tends to be accelerated due to the fact that, since current limiters are not perfect, the current conducted by the current limiter of the first unit Mi to be turned on increases when the voltage between terminals b1 and b2 of the current limiter increases.

For example, in the assembly of FIG. 3, in case of a turning on of a unit $M_i$, resistor R2 substantially sees the voltage between terminals b1 and b2 of the current limiter of the unit, and tends to add to the current regulated via resistor R1 a current proportional to the overvoltage of the unit. Resistor R2 may for example be sized to ensure that the other units Mi of the device reach their respective turn-on thresholds before the voltage across the current limiter 201 of the first unit to be turned on reaches a critical threshold beyond which the current limiter risks being damaged.

As a complement, each current limiter 201 may comprise its own current limiter, enabling to limit the voltage rise between its terminals b1 and b2, to protect the current limiter. For example, in the assembly of FIG. 3, current limiter 201 may further comprise, in parallel with resistor R2, an additional branch (optional and shown in strip-dot lines in the drawing) comprising a Zener diode Z1 in series with a resistor R3. In the shown example. Zener diode Z1 has its cathode coupled, for example, connected, to node p3 and its anode coupled, for example, connected, to a first end of resistor R3, the second end of resistor R3 being coupled, for example, connected, to the junction point of resistor R2 and transistor T2.

Figure 4:
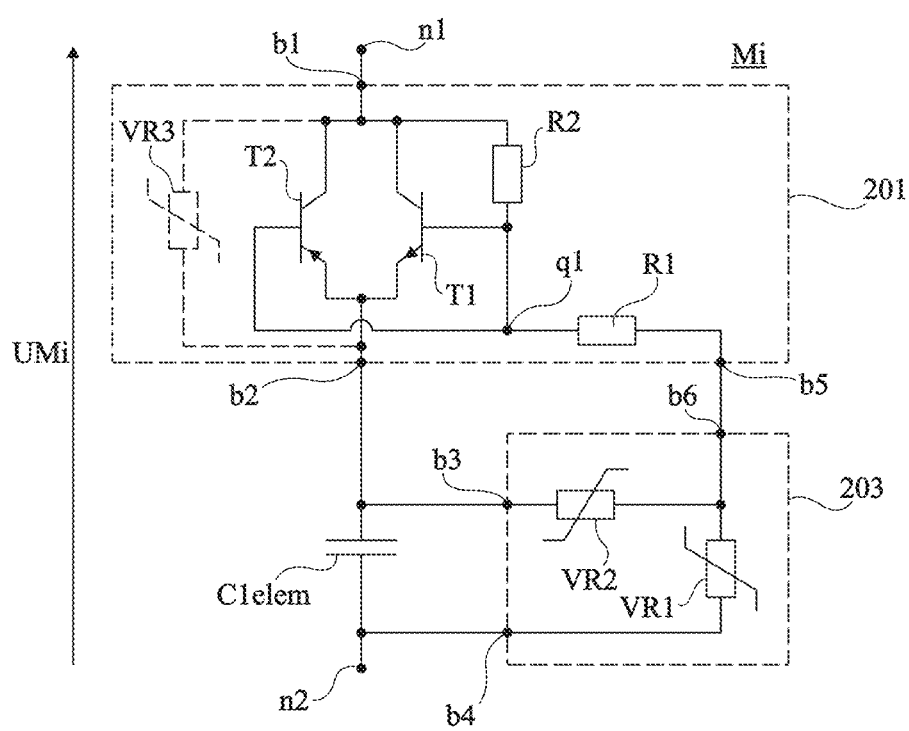
FIG. 4 is an electric diagram of an embodiment of an elementary capacitive unit of the capacitive power supply circuit of FIG. 2.

FIG. 4 is an electric diagram of an embodiment of an elementary capacitive unit Mi of the circuit of FIG. 2, particularly detailing another embodiment of current limiter 201 and an embodiment of voltage limiter 203.

In this example, current limiter 201 interrupts current IS by turning on a transistor, controlled by the turning-on of voltage limiter 203. For this purpose, current limiter 201 comprises a terminal b5 of application of a control signal coupled, for example, connected, to a terminal b6 for supplying a signal for controlling voltage limiter 203.

The current limiter 201 of FIG. 4 comprises two transistors T1 and T2 coupled in parallel between terminals b1 and b2 of the current limiter. Transistors T1 and T2 each have a first conduction node coupled, for example connected, to terminal b1, and a second conduction node coupled, for example, connected, to terminal b2. Transistors T1 and T2 each have a control node coupled, for example, connected, to a node q1. Current limiter 201 further comprises a resistor R1 having a first end coupled, for example, connected, to node q1 and a second end coupled, for example, connected, to node b5. Current limiter 201 further comprises a resistor R2 having a first end coupled, for example, connected, to terminal b1 and a second end coupled, for example, connected, to node q1. As an example, transistor T1 is an NPN transistor having its collector on the side of terminal b1 and its emitter on the side of terminal b2, and transistor T2 is a PNP transistor having its collector on the side of terminal b1 and its emitter on the side of terminal b2.

The voltage limiter 203 of FIG. 4 comprises two varistors VR1 and VR2 series-coupled between its terminals b4 and b3, the junction point of the two varistors being coupled to terminal b6. In the shown example, varistor VR1 has a first end coupled, for example, connected, to terminal b4 and a second end coupled, for example, connected, to terminal b6, and varistor VR2 has a first end coupled, for example, connected, to terminal b6 and a second end coupled, for example, connected, to terminal b3.

When the voltage $U_{Mi}$ between terminals n1 and n2 of unit Mi is between the low (negative) and high (positive) action thresholds of varistor VR1, transistor T1 or T2 (according to the direction of current IS) turns on under the action of resistor R2.

When the voltage $U_{Mi}$ between terminals n1 and n2 of unit Mi exceeds the high action threshold of varistor VR1, a potential difference appears across resistor R1, which creates a current which opposes the bias current induced by resistor R2 at the base of transistor T1. When voltage $U_{Mi}$ becomes sufficiently high, transistor T1 ends up fully turning off. Transistor T2 remains off as long as voltage $U_{Mi}$ remains greater than the voltage across capacitor C1elem.

When voltage $U_{Mi}$ passes under the low (negative) action threshold of varistor VR1, a potential difference appears across resistor R1, which creates a current which opposes the bias current induced by resistor R2 at the base of transistor T2. When voltage $U_{Mi}$ becomes sufficiently high, transistor T2 ends up fully turning off. Transistor T1 remains off as long as voltage $U_{Mi}$ remains smaller than the voltage across capacitor C1elem.

Varistor VR2, which is optional, enables to limit the voltage difference across resistor R1 and thus the base currents of transistors T1 and T2 in case of a positive or negative overvoltage. It further enables, combined in series with varistor VR1, to limit the voltage across capacitor C1elem, for example, if transistor T1 or T2 takes time to turn off during an overvoltage.

Current limiter 201 may further comprise an optional varistor VR3, shown in dashed lines in FIG. 4, enabling to protect current limiter 201 against overvoltages to trigger the voltage and current limiters of the other units Mi of the power supply circuit. In this example, varistor VR3 has a first terminal coupled, for example, connected, to terminal b1 of current limiter 201 and a second terminal coupled, for example, connected, to terminal b2 of current limiter 201.

Figure 5:
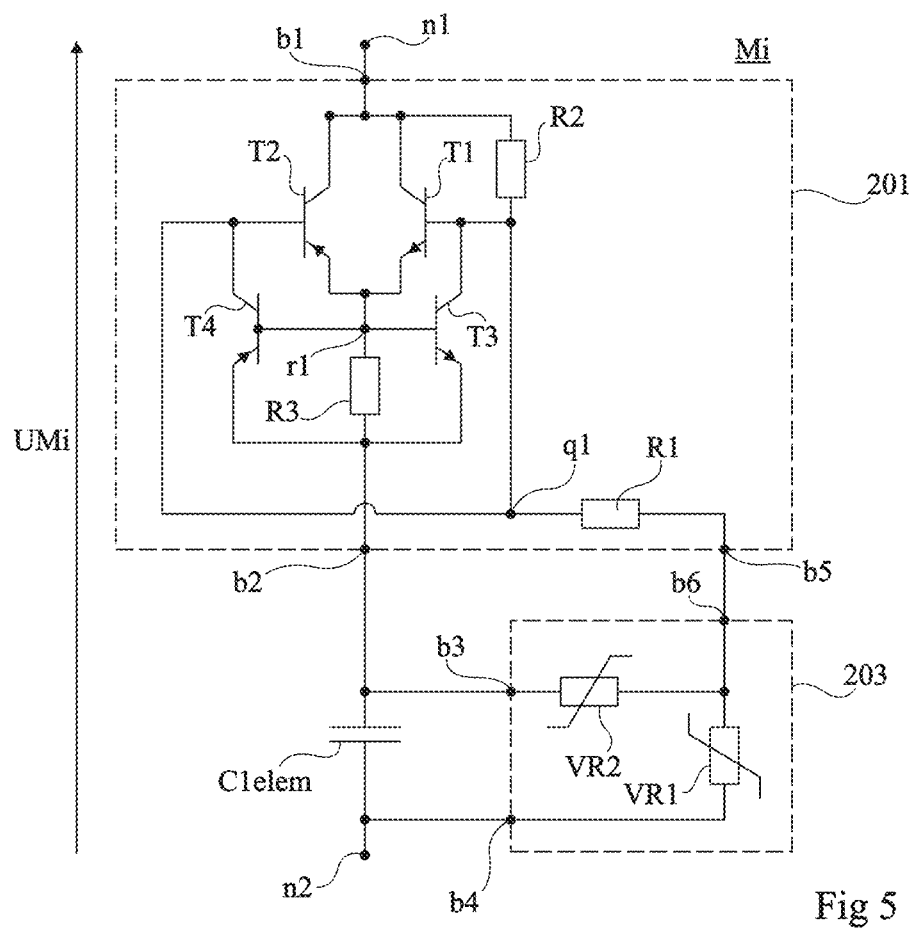
FIG. 5 is an electric diagram of another embodiment of an elementary capacitive unit of the capacitive power supply circuit of FIG. 2.

FIG. 5 is an electric diagram illustrating an alternative embodiment of the unit Mi of FIG. 4. The unit Mi of FIG. 5 comprises elements common with the unit Mi of FIG. 4. Hereafter, only the differences between the two units will be detailed.

The unit Mi of FIG. 5 differs from the unit Mi of FIG. 4 in that, in the example of FIG. 5, the conduction nodes of transistors T1 and T2 opposite to terminal b1 (that is, the emitter of transistor T1 and the emitter of transistor T2) are not directly connected to terminal b2, but are connected to a node r1, unit Mi further comprising a resistor R3 having a first end coupled, for example, connected, to node r1 and a second end coupled, for example, connected, to terminal b2. The unit Mi of FIG. 5 further comprises an additional transistor T3 having a first conduction node coupled, for example, connected, to the control node of transistor T1 and a second conduction node coupled, for example, connected, to terminal b2, and an additional transistor T4 having a first conduction node coupled, for example, connected, to the control node of transistor T2 and a second conduction node coupled, for example, connected, to terminal b2. The control nodes of transistors T3 and T4 are coupled, for example, connected, to node r1. As an example, transistor T3 is an NPN transistor having its collector on the side of transistor T1 and its emitter on the side of terminal b2, and transistor T4 is a PNP transistor having its collector on the side of transistor T2 and its emitter on the side of terminal b2.

In the example of FIG. 5, the operation of voltage limiter 201 is identical to what has been described in relation with FIG. 4. Current limiter 203 has an operation similar to that of FIG. 3, but for the fact that, as compared with the example of FIG. 3, the current limiter of FIG. 5 has been symmetrized to be bidirectional for current without using a diode bridge.

Although this has not been shown in FIG. 5, a voltage protection varistor may, as in the example of FIG. 4, be provided between terminals b1 and n2 of current limiter 203.

Figure 6:
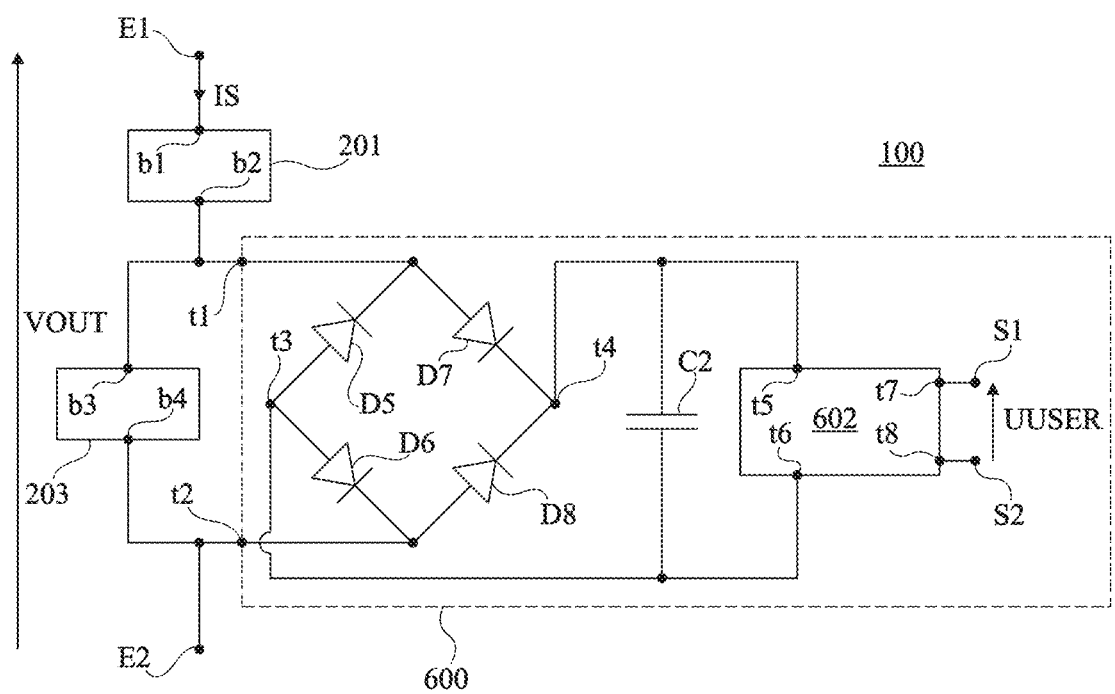
FIG. 6 is a simplified electric diagram of an embodiment of an output conversion unit of the capacitive power supply circuit of FIG. 2.

FIG. 6 is a simplified electric diagram of an embodiment of the output conversion unit 100 of the capacitive power supply circuit of FIG. 2.

As illustrated in FIG. 6, the output conversion unit may also comprise a current limiter 201, for example, identical or similar to the current limiters 201 of capacitive units $M_i$, and/or a current limiter 203, for example, identical or similar to the current limiters 203 of capacitive units Mi.

In the example of FIG. 6, output conversion unit 100 comprises a current limiter 201, a voltage limiter 203, and an output conversion circuit 600.

Current limiter 201 has its terminal b1 coupled, for example, connected, to the input terminal E1 of unit 100, and its terminal b2 coupled, for example, connected, to a first input node t1 of circuit 600, circuit 600 comprising a second input node t2 coupled, for example, connected, to the input terminal E2 of unit 100. Voltage limiter 203 has its terminal b3 coupled, for example, connected, to node t1 and its terminal b4 coupled, for example, connected, to node t2.

In this example, circuit 600 comprises a rectifying diode bridge comprising two input nodes coupled, for example, connected, respectively to nodes t1 and t2, and two output nodes t3 and t4 coupled, for example, connected, across a smoothing capacitor C2. More particularly, in this example, the rectifying bridge comprises four diodes D5, D6. D7, and D8. Diode D5 has its cathode coupled, for example, connected, to node t1 and its anode coupled, for example, connected, to node t3, diode D6 has its cathode coupled, for example, connected, to node t2 and its anode coupled, for example, connected, to node t3, diode D7 has its cathode coupled, for example, connected, to node t4 and its anode coupled, for example, connected, to node t1, and diode D8 has its cathode coupled, for example, connected, to node t4 and its anode coupled, for example, connected, to node t2. In this example, circuit 600 further comprises a DC/DC conversion stage 602 comprising input nodes t5 and t6 coupled, for example, connected, respectively to nodes t4 and t3 (that is, across capacitor C2), and output nodes t7 and t8 coupled, for example, connected, respectively to output terminals S1 and S2 of unit 100.

Figure 7:
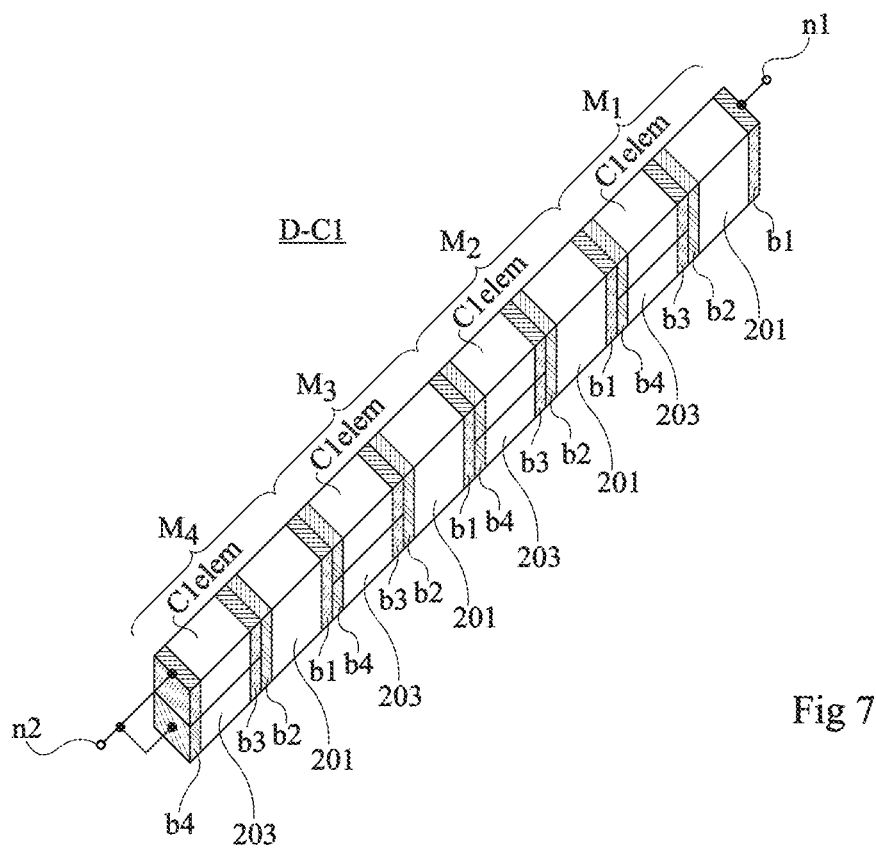
FIG. 7 is a perspective view schematically illustrating an example of implementation of a distributed capacitive structure of the power supply circuit of FIG. 2.

FIG. 7 is a perspective view schematically illustrating an example of implementation of the distributed capacitive structure D-C1 of the capacitive power supply circuit of FIG. 2. In the shown example, structure D-C1 comprises K=4 elementary capacitive units M1, M2, M3, and M4. In this example, each unit Mi is formed of three discrete components respectively corresponding to capacitor C1elem, to current limiter 201, and to voltage limiter 203. The electrodes b1 and b2 of current limiter 201 are arranged on two opposite surfaces of component 201, the electrodes b3 and b4 of voltage limiter 203 are arranged on two opposite surfaces of the component, and the electrodes of capacitor C1elem (not referenced) are arranged on two opposite surfaces of the component. In each unit $M_i$, the electrode b2 of current limiter 201 is directly welded to the electrode b3 of voltage limiter 203 and to a first electrode of capacitor C1elem. At the interface between two neighboring units Mi and Mi+1, the electrode b4 of unit Mi and the second electrode of capacitor C1elem of unit Mi are directly welded to the electrode b1 of the current limiter 201 of unit Mi+1. The weldings may be performed with a rigid welding material or, preferably, with a flexible welding material. Units Mi are arranged in linear form, that is, aligned along a same longitudinal axis. Thus, the distance between terminals A1 and E1 of the distributed capacitive structure is substantially equal to K times the length of a unit Mi. Further, the distance between two elementary capacitors C1elem of neighboring units Mi is substantially equal to the length of the current limiter 201 which separates them. The assembly of units Mi may be arranged in a rigid or flexible insulating sheath (not shown in the drawing), enabling to ensure the mechanical resistance and the protection of the structure.

Figure 8:
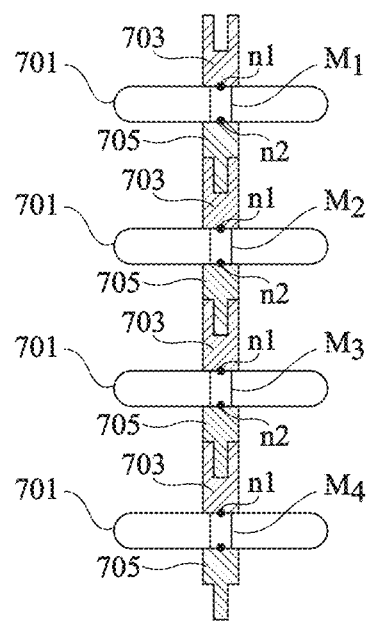
FIG. 8 is a perspective view schematically illustrating another example of implementation of a distributed capacitive structure of the power supply circuit of FIG. 2.

FIG. 8 is a cross-section view schematically illustrating another example of implementation of the distributed capacitive structure D-C1 of the capacitive power supply circuit of FIG. 2.

In this example, it is provided to integrate the elementary capacitive units Mi in insulator-type devices. An insulator conventionally comprises a plate 701 made of an insulating material, for example, of glass or of ceramic. A first metallic bonding part 703 is fastened to a first surface (the upper surface in the orientation of FIG. 8) of the plate part 703 having, in top view, a surface area smaller than that of plate 701, for example, at least twice smaller than that of plate 701 and being substantially arranged at the center of plate 701. A second metallic bonding part 705 is further fastened to a second surface (the lower surface in the orientation of FIG. 8) of plate 701, part 705 having, in top view, a surface area smaller than that of plate 701 for example, at least twice smaller than that of plate 701, and being substantially arranged at the center of plate 701. Each of metallic bonding parts 703 and 705 may be fastened to a conductor or to a metallic bonding part of another insulator or of a tower.

In the example of FIG. 8, it is provided to integrate each unit Mi in a cavity formed in a central portion of the plate 701 of an insulator, by connecting terminals n1 and n2 of unit Mi respectively to the metallic bonding part 703 and to the metallic bonding part 705 of the insulator. Distributed capacitor structure D-C1 may thus be formed by placing in series K insulators, via their metallic bonding parts 703 and 705. In the shown example, the distributed capacitive structure comprises K=4 elementary capacitive units M1, M2, M3, and M4 respectively arranged in K=4 insulators.

It should further be noted that, similarly, all or part of output conversion unit 100 may be integrated in a cavity formed in a central portion of the plate 701 of an insulator.

Various embodiments and variants have been described. Those skilled in the art will understand that certain features of these various embodiments and variants may be combined, and other variants will occur to those skilled in the art. In particular, the described embodiments are not limited to the examples of current limiting circuits and of voltage limiting circuits described in relation with FIGS. 3, 4, and 5.

Further, the described embodiments are not limited to the examples of integration of the distributed capacitive structure described in relation with FIGS. 7 and 8.

The invention claimed is:

1. A capacitive power supply circuit comprising, between first and second terminals of application of an AC input voltage, a distributed capacitive structure comprising a plurality of elementary capacitive units, each comprising a current limiter series-connected with a capacitor between first and second terminals of the unit and a voltage limiter connected in parallel with the capacitor, the elementary capacitive units being series-coupled by their first and second terminals.

2. The capacitive power supply circuit according to claim 1, further comprising an output conversion unit in series with the distributed capacitive structure between the first and second terminals of application of the AC input voltage.

3. The capacitive power supply circuit according to claim 1, wherein a distance between two elementary capacitive units increases as the electrical distance between the two elementary units increases.

4. The capacitive power supply circuit of claim 1, wherein the distance between the capacitors of neighboring elementary capacitive units is greater than or equal to 1 cm, the distance between the current limiters of neighboring elementary capacitive units is greater than or equal to 1 cm, and the distance between the voltage limiters of neighboring elementary capacitive units is greater than or equal to 1 cm.

5. The capacitive power supply circuit according to claim 1, wherein, in each elementary capacitive unit, the voltage limiter has a turn-on threshold in the range from 10 to 40% of the nominal amplitude of the AC input voltage.

6. The capacitive power supply circuit according to claim 1, wherein, in each elementary capacitive unit, the current limiter triggers when the current that it conducts exceeds a predetermined threshold.

7. The capacitive power supply circuit according to claim 1, wherein, in each elementary capacitive unit, the current limiter is triggered via a control signal generated by the voltage limiter.

8. The capacitive power supply circuit according to claim 1 wherein, in each elementary capacitive unit, the current limiter is bidirectional for current and the voltage limiter is bidirectional for voltage.

9. The capacitive power supply circuit according to claim 1, wherein, in each elementary capacitive unit, the voltage limiter comprises:
- a varistor; or
- a series association of two Zener diodes head-to-tail; or
- a transistor assembly; or
- a spark gap.

10. The capacitive power supply circuit according to claim 1, wherein, in each elementary capacitive unit, the voltage limiter comprises:
- a thermo-resistor or a thermistor;
- a resettable fuse; or
- a transistor assembly.

11. The capacitive power supply circuit according to claim 1, wherein, in each elementary capacitive unit, the current limiter comprises a first branch comprising a first bipolar transistor and a first resistor in series between first and second conduction terminals of the current limiter and, in parallel with the first branch, a second branch comprising a second resistor and a second bipolar transistor in series between the first and second conduction terminals of the current limiter, the first and second bipolar transistors being of the same conductivity type, the first transistor having a control node coupled to the junction point of the first resistor and of the second transistor, and the second transistor having a control node coupled to the junction point of the first transistor and of the first resistor.

12. The capacitive power supply circuit according to claim 1, wherein, in each elementary capacitive unit, the current limiter comprises first and second bipolar transistors of opposite conductivity types connected in parallel between first and second conduction terminals of the current limiter, the first transistor having a control terminal connected to a control terminal of the second transistor, the control terminals of the first and second transistors being coupled on the one hand to a control terminal of the current limiter via a first resistor and on the other hand to the first conduction terminal of the current limiter via a second resistor (R2).

13. The capacitive power supply circuit according to claim 12, wherein, in each elementary capacitive unit, the voltage limiter comprises first and second varistors in series between first and second electrodes of the capacitor, the junction point of the first- and second varistors being connected to the control terminal of the current limiter.

14. The capacitive power supply circuit according to claim 1, wherein each elementary capacitive unit is formed of three discrete components respectively corresponding to the capacitor, to the current limiter, and to the voltage limiter, the elementary capacitive units being arranged linearly so that the capacitors of any two neighboring elementary capacitive units are separated by the current limiter of one of the two units, and so that the voltage limiters of any two neighboring elementary capacitive units are separated by the current limiter of one of the two units.

15. The capacitive power supply circuit according to claim 14, wherein the elementary capacitive units are arranged in a same insulating protection sheath.

16. The capacitive power supply circuit according to claim 1, wherein the distributed capacitive structure comprises a plurality of insulators, each comprising a plate made of an insulating material, a first metallic bonding part fastened to a first surface of the plate, and a second metallic bonding part fastened to a second surface of the plate, the insulators being series-coupled by their first and second metallic bonding parts, and each elementary capacitive unit being arranged in a cavity formed in the plate of one of the insulators and having its first and second terminals in contact respectively with the first and second metallic bonding parts of the insulator.

17. The capacitive power supply circuit according to claim 1, wherein, in each elementary capacitive unit, the voltage limiter comprises:
- a metal-oxide varistor,
- a series association of two Zener diodes head-to-tail; or
- a transistor assembly; or
- a spark gap.

18. The capacitive power supply circuit according to claim 1, wherein, in each elementary capacitive unit, the voltage limiter comprises:
- a zinc-oxide varistor;
- a series association of two Zener diodes head-to-tail; or
- a transistor assembly; or
- a spark gap.

* * * * *

UNITED STATES PATENT AND TRADEMARK OFFICE
CERTIFICATE OF CORRECTION

| | |
|---|---|
| PATENT NO. | : 11,211,789 B2 |
| APPLICATION NO. | : 16/869353 |
| DATED | : December 28, 2021 |
| INVENTOR(S) | : Ghislain Despesse |

It is certified that error appears in the above-identified patent and that said Letters Patent is hereby corrected as shown below:

On the Title Page

Column 1, (72) Inventor reads:
"Ghislain Despesse, Vereppe (FR)"
Should read:
--Ghislain Despesse, Grenoble (FR)--

Signed and Sealed this
Twenty-fourth Day of May, 2022

Katherine Kelly Vidal
*Director of the United States Patent and Trademark Office*